United States Patent
Narayanan et al.

(10) Patent No.: US 11,563,293 B2
(45) Date of Patent: Jan. 24, 2023

(54) PORT BEACON PLUG

(71) Applicant: Dell Products L.P., Round Rock, TX (US)

(72) Inventors: Padmanabhan Narayanan, Redmond, WA (US); Vamshidhar Varre, Hyderabad (IN)

(73) Assignee: Dell Products L.P., Round Rock, TX (US)

(*) Notice: Subject to any disclaimer, the term of this patent is extended or adjusted under 35 U.S.C. 154(b) by 84 days.

(21) Appl. No.: 17/225,251

(22) Filed: Apr. 8, 2021

(65) Prior Publication Data

US 2022/0329020 A1 Oct. 13, 2022

(51) Int. Cl.
*H01R 13/71* (2006.01)
*H01R 13/717* (2006.01)
*H01R 13/66* (2006.01)
*G02B 6/42* (2006.01)

(52) U.S. Cl.
CPC ....... *H01R 13/7175* (2013.01); *G02B 6/4246* (2013.01); *H01R 13/665* (2013.01)

(58) Field of Classification Search
CPC . H01R 13/7175; H01R 13/665; G02B 6/4246
See application file for complete search history.

(56) References Cited

U.S. PATENT DOCUMENTS

| | | | | |
|---|---|---|---|---|
| 9,608,377 | B1* | 3/2017 | Phillips | H01R 13/7172 |
| 9,991,649 | B1* | 6/2018 | Nguyen | H01R 13/7175 |
| 11,424,953 | B2* | 8/2022 | Crayford | H04L 49/351 |
| 2009/0258534 | A1* | 10/2009 | Bright | G02B 6/4246 |
| | | | | 439/490 |
| 2011/0243505 | A1* | 10/2011 | Su | H01R 24/64 |
| | | | | 385/75 |
| 2017/0288340 | A1* | 10/2017 | Morrison | G06F 13/4282 |
| 2019/0363493 | A1* | 11/2019 | Sironi | G06F 1/266 |
| 2022/0265921 | A1* | 8/2022 | Gupta | A61B 5/1468 |
| 2022/0266901 | A1* | 8/2022 | Kim | B62D 5/0481 |
| 2022/0271973 | A1* | 8/2022 | Vavintaparthi | H04L 12/422 |

* cited by examiner

Primary Examiner — Truc T Nguyen
(74) Attorney, Agent, or Firm — Jackson Walker L.L.P.

(57) ABSTRACT

A module may include a connector configured to electrically couple with a communications port of an information handling system, the connector comprising a plurality of electrical conduits, a housing configured to house the connector and shaped to mechanically engage with the communications port, and a visual indicator communicatively coupled to the plurality of electrical conduits and configured to visually indicate information associated with the communications port when the connector is communicatively coupled to the communications port.

19 Claims, 3 Drawing Sheets

PORT BEACON PLUG

TECHNICAL FIELD

The present disclosure relates in general to information handling systems, and more particularly to systems and methods for providing a visual indicator or beacon indicating a location of a port unpopulated by an optical transceiver module.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system. One of skill in the art will appreciate that this disclosure is also applicable to Direct Attach Cable (DAC) transceiver modules in addition to the other types of transceiver modules described herein.

Existing network switches often have light-emitting diodes (LEDs) integrated into their front plates, wherein the LEDs provide an indication of link and activity for associated switch ports. With single network switches often having 32 ports or more, the associated LEDs may provide valuable information to network administrators. However, such integrated LEDs have some limitations.

For example, most of the switch ports may be coupled to servers and other equipment in a rack, and the large number of cables running from a switch may make it difficult to view an LED status of a particular port. Further, fiber optic ports may have optical transceivers plugged into the ports, making it harder to view an LED status of a particular port. In addition, cable management is used less frequently in test environments, which may render cable runs unsightly and LED status difficult to discern. Moreover, optical transceivers may have integrated tabs and cables may have push-pull tabs that also obstruct views of some switch LEDs.

Accordingly, in a data center environment, it may be difficult for a user (e.g., administrator or information technology technician) to locate switch ports unpopulated by optical transceivers.

SUMMARY

In accordance with the teachings of the present disclosure, the disadvantages and problems associated with existing visual indicators for an information handling system may be reduced or eliminated.

In accordance with embodiments of the present disclosure, a module may include a connector configured to electrically couple with a communications port of an information handling system, the connector comprising a plurality of electrical conduits, a housing configured to house the connector and shaped to mechanically engage with the communications port, and a visual indicator communicatively coupled to the plurality of electrical conduits and configured to visually indicate information associated with the communications port when the connector is communicatively coupled to the communications port.

In accordance with these and other embodiments of the present disclosure, a method for fabricating a module may include housing, within a housing, a connector configured to electrically couple with a communications port of an information handling system, wherein the connector comprises a plurality of electrical conduits and wherein the housing is shaped to mechanically engage with the communications port. The method may also include communicatively coupling a visual indicator to the plurality of electrical conduits, wherein the visual indicator is configured to visually indicate information associated with the communications port when the connector is communicatively coupled to the communications port.

In accordance with these and other embodiments of the present disclosure, an information handling system may include a processor and a module communicatively coupled to the processor and comprising a connector configured to electrically couple with a communications port of an information handling system, the connector comprising a plurality of electrical conduits, a housing configured to house the connector and shaped to mechanically engage with the communications port, and a visual indicator communicatively coupled to the plurality of electrical conduits and configured to visually indicate status information associated with the communications port when the connector is communicatively coupled to the communications port.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
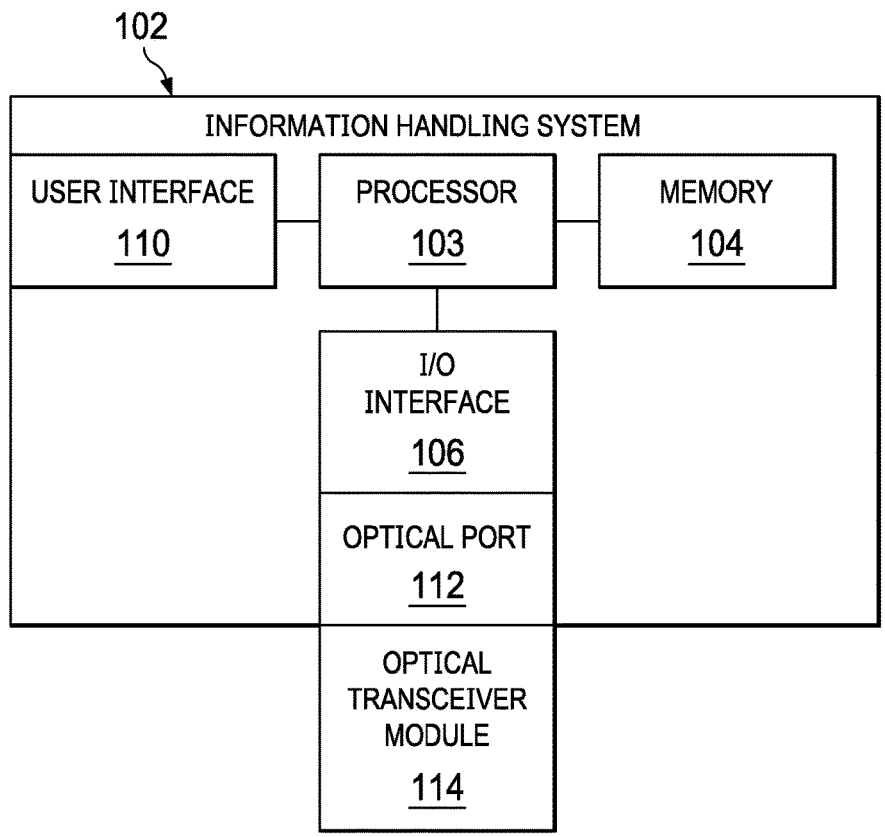
FIG. 1 illustrates a block diagram of selected components of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an electrical connector in the form of any suitable combination of a jack, a socket, and/or "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include an SFP transceiver, a QSFP transceiver, or any other suitable form factor.

In addition to processor 103, memory 104, I/O interface 106, user interface 110, optical port 112, and optical transceiver module 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
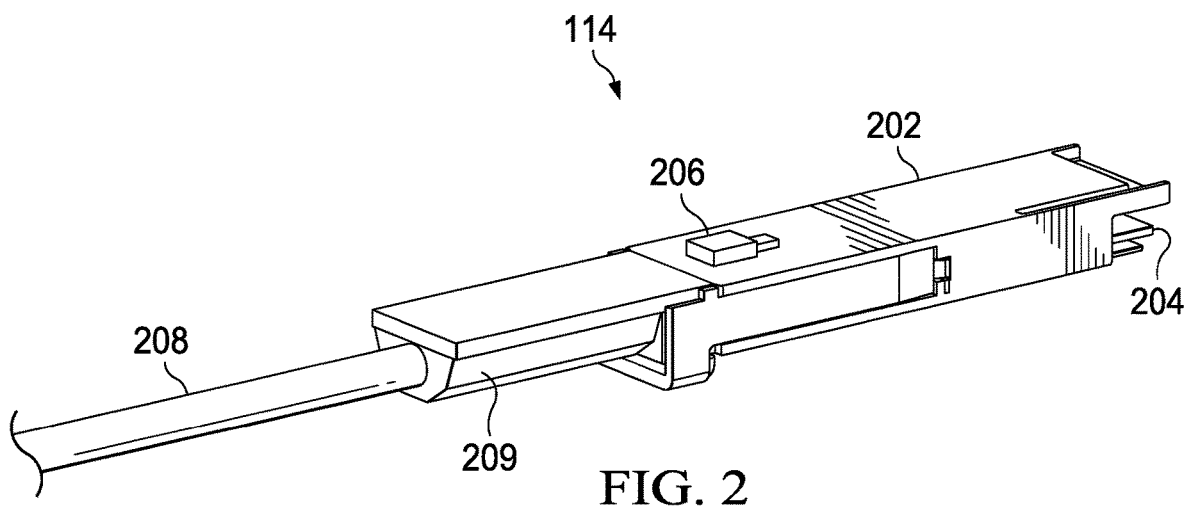
FIG. 2 illustrates a perspective view of an example optical transceiver module, in accordance with embodiments of the present disclosure.

FIG. 2 illustrates a perspective view of an example optical transceiver module 114 and cable 208 inserted into optical transceiver module 114, in accordance with embodiments of the present disclosure. In some embodiments, example optical transceiver module 114 depicted in FIG. 2 may be used to implement optical transceiver module 114 of FIG. 1. As shown in FIG. 2, optical transceiver module 114 may include a housing 202 for housing an optical transceiver 204 and one or more other components, a cable 208, and a strain relief feature 209. Housing 202 may comprise a metal enclosure configured to house and/or provide mechanical structure for optical transceiver 204, including mechanical features (e.g., guiding features) for aligning and/or mechanically securing optical transceiver 204 to I/O interface 106 via optical port 112.

Optical transceiver 204 may include any system, device, or apparatus configured to receive an incoming optical signal (e.g., via cable 208), convert the incoming optical signal into an equivalent electrical signal, and communicate such equivalent electrical signal to I/O interface 106 (e.g., via optical port 112), and also configured to receive an electrical signal from I/O interface 106 (e.g., via optical port 112), convert such electrical signal into an equivalent optical signal, and communicate such optical signal as an outgoing optical signal (e.g., via cable 208).

Cable 208 may include any suitable system, device, or apparatus capable of passing optical signals therethrough. For example, cable 208 may include one or more optical fibers surrounded by optically opaque material and/or material for protecting such one or more optical fibers. Such one or more optical fibers integral to cable 208 may be optically coupled to optical transceiver 204, thus enabling communication with optical transceiver 204 via such optical fibers.

Strain relief feature 209 may mechanically enclose cable 208 and may be formed from any suitable material that may be configured to provide strain relief to cable 208 while also providing support to the extension of housing 202.

Figure 3:
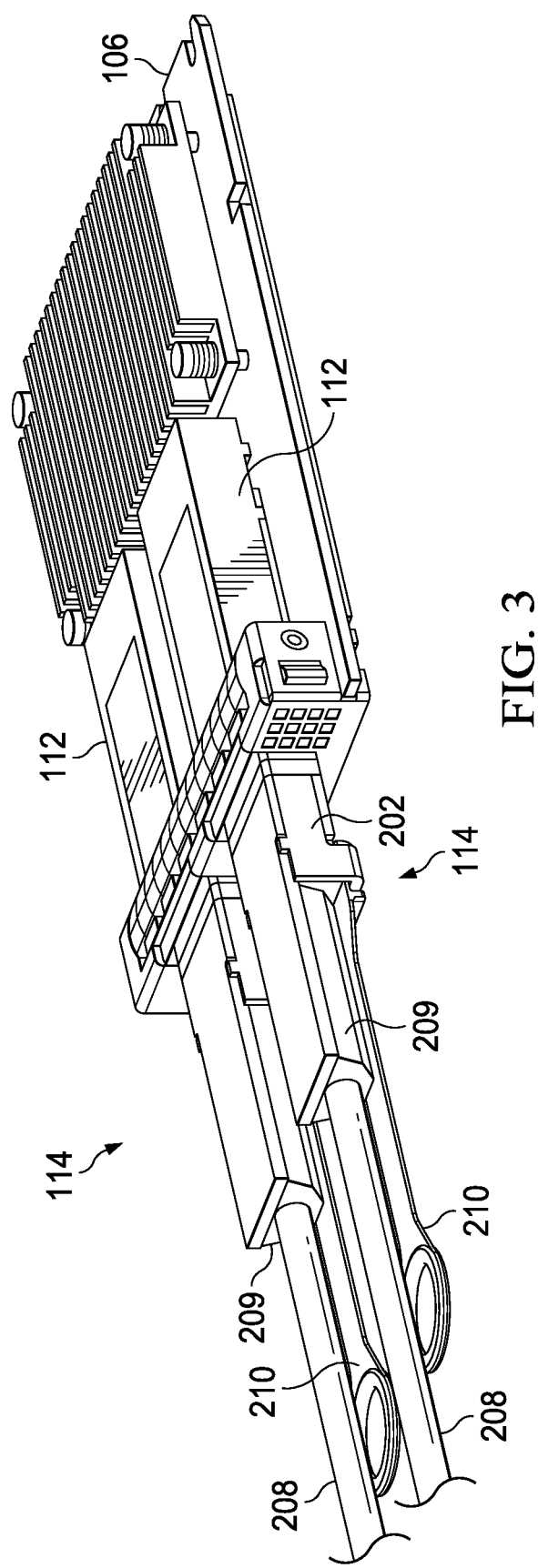
FIG. 3 illustrates a perspective view of two instances of the example optical transceiver module shown in FIG. 2 inserted into respective optical ports of an I/O interface, in accordance with embodiments of the present disclosure.

FIG. 3 illustrates a perspective view of two instances of example optical transceiver module 114 shown in FIG. 2 inserted into respective optical ports 112 of I/O interface 106, in accordance with embodiments of the present disclosure. FIG. 3 illustrates pull tabs 210 that may be integral to each cable 208 and may assist a user in removing a cable from an optical transceiver module 114.

Figure 4:
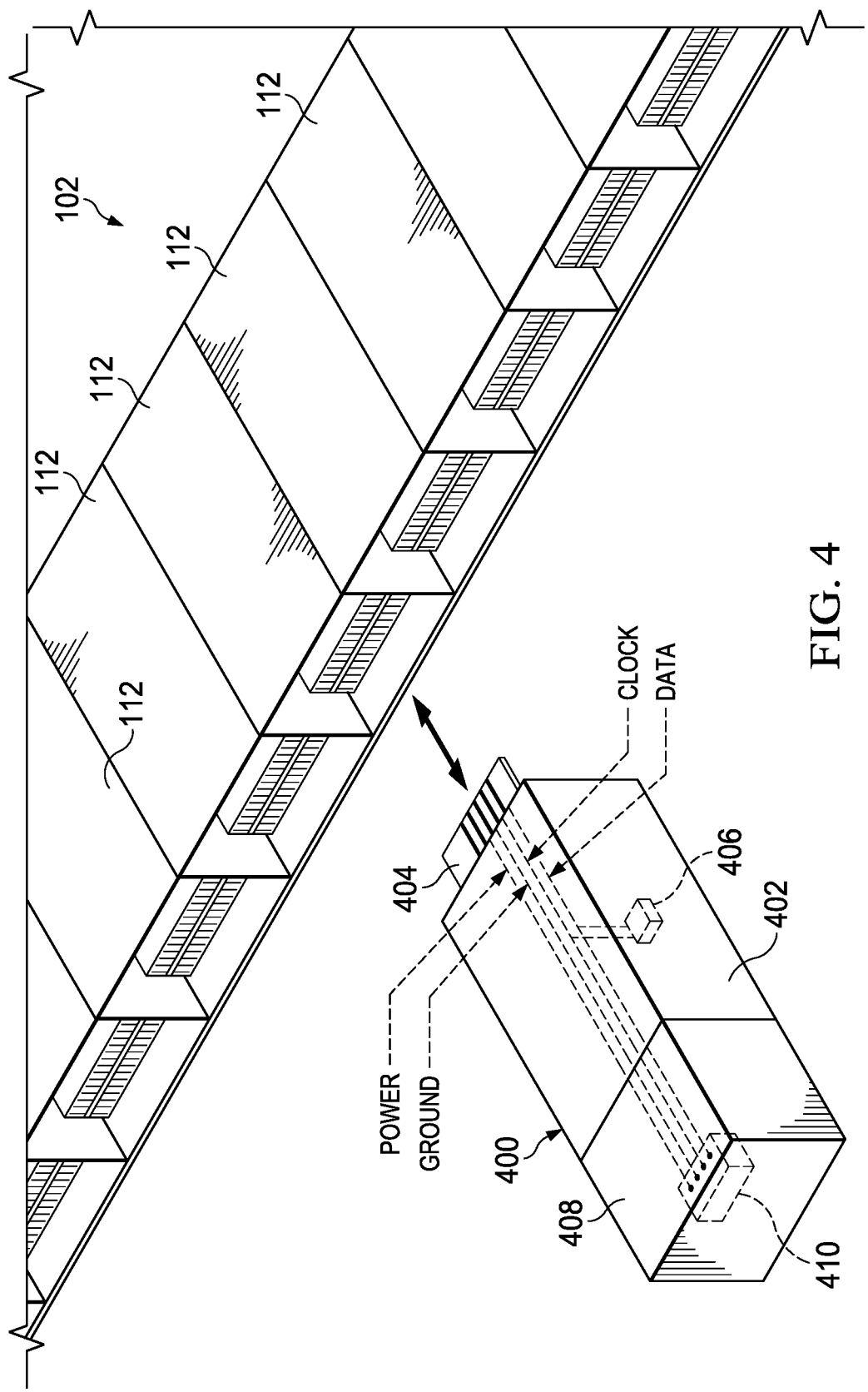
FIG. 4 illustrates a perspective view of a port beacon plug configured to be inserted into an optical port in lieu of an optical transceiver, in accordance with embodiments of the present disclosure.

FIG. 4 illustrates a perspective view of a port beacon plug 400 configured to be inserted into an optical port 112 in lieu of an optical transceiver 114, in accordance with embodiments of the present disclosure. As shown in FIG. 4, port beacon plug 400 may comprise a housing 402, configured to enclose connector 404, electrically-erasable programmable read-only memory (EEPROM) 406, and a plurality of electrical conduits (e.g., pins, wires, printed circuit board traces, etc.). Housing 402 may be constructed of any suitable material (e.g., metal) and may be sized and shaped to have two physical dimensions (e.g., height and width) approximately identical to that of housing 202 of an optical transceiver 114, thus allowing housing 402 to mechanically engage with optical port 112 in a manner similar to that of an optical transceiver 114.

Connector 404 may comprise any suitable printed circuit board, edge connector, or other suitable connector configured to electrically couple to a corresponding connector of optical port 112. As shown in FIG. 4, connector 404 may include a plurality of pins, including pins for presence detection, power, ground, clock, and data signals, labeled as PRESENCE, POWER, GROUND, CLOCK, and DATA, respectively. Electrical conduits for such signals may extend from the pins of connector 404 to an opposite end of housing 402.

EEPROM 406 may be communicatively coupled to pins for the clock and data signals.

As also shown in FIG. 4, port beacon plug 400 may include an enclosure 408 mechanically coupled to an end of housing 402 opposite of connector 404 and configured to house visual indicator 410. Enclosure 408 may be optically transparent or optically translucent, to allow at least some of the light emitted by visual indicator 410 to pass through enclosure 408. Accordingly, enclosure 408 may be made from glass, acrylic, clear plastic, or any other suitable material which is at least partially optically transmissive. Enclosure 408 may be in the shape of a "cap" and may be mechanically coupled to housing 402 in any suitable manner (e.g., a gripping force, adhesive, mechanical fasteners, etc.).

Visual indicator 410 may comprise any system, device, or apparatus configured to emit light or other visual stimulus to indicate to a person a status (e.g., port location, etc.) associated with the optical port 112 into which port beacon plug 400 is inserted. For example, in some embodiments, each visual indicator 410 may comprise a light-emitting diode (LED). In some embodiments, each visual indicator 410 may have two possible visual states (e.g., on or off, with "on" indicating that port beacon plug 400 is inserted into an optical port 112). In other embodiments, each visual indicator 410 may have three or more possible visual states (e.g., on or off, and different colors, blink rates, or other behaviors). In some embodiments, visual indicator 410 may comprise a "smart LED" whose behavior is defined by programmable logic stored within port beacon plug 400.

Accordingly, in such embodiments, a user may program desired behavior of visual indicator 410 to provide a location of optical port 112 and/or information handling system 102. To enable such functionality, electrical conduits (e.g., pins, wires, printed circuit board traces, etc.) may extend from housing 404 to visual indicator 410 as shown in FIG. 4.

In operation, when port beacon plug 400 is inserted into optical port 112 at a port location N of information handling system 102, processor 103 may read (e.g., via an Inter-Integrated Circuit (I2C) interface) EEPROM 406 of port beacon plug 400 to determine that the device inserted is a port beacon plug 400 and not an optical transceiver module 114. EEPROM 406 may store the capabilities and the I2C address of visual indicator 410 which may include an integrated programmable logic device. A user (e.g., interfacing with software or other module executing on processor 103) may program visual indicator with desired behavior. Such programming may occur over via an I2C interface implemented by the clock signal and the data signal between processor 103 and visual indicator 410. The user may desire to locate port location N on information handling system 102 and thus issue an appropriate command line interface command (e.g., "beacon <port-N> ON-color <color> --brigh-tness <brightness> --blink <blink rate>").

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A module, comprising:
   a connector configured to electrically couple with a communications port of an information handling system, the connector comprising a plurality of electrical conduits, and wherein the communications port is an optical port configured to receive an optical transceiver;
   a housing configured to house the connector and shaped to mechanically engage with the communications port; and
   a visual indicator communicatively coupled to the plurality of electrical conduits and configured to visually indicate information associated with the communications port when the connector is communicatively coupled to the communications port.

2. The module of claim 1, wherein the module shares at least two physical dimensions of the optical transceiver.

3. The module of claim 1, wherein behavior of the visual indicator is programmable.

4. The module of claim 3, wherein the module further comprises a programmable logic device communicatively coupled to the plurality of electrical conduits and the visual indicator, wherein the programmable logic device is configured to be programmed to control behavior of the visual indicator.

5. A module comprising:
   a connector configured to electrically couple with a communications port of an information handling system, the connector comprising a plurality of electrical conduits;
   a housing configured to house the connector and shaped to mechanically engage with the communications port;
   a visual indicator communicatively coupled to the plurality of electrical conduits and configured to visually indicate information associated with the communications port when the connector is communicatively coupled to the communications port; and
   an optically-transmissive enclosure mechanically coupled to the housing and configured to enclose the visual indicator.

6. The module of claim 1, wherein the visual indicator comprises a light-emitting diode.

7. A module, comprising:
a connector configured to electrically couple with a communications port of an information handling system, the connector comprising a plurality of electrical conduits;
a housing configured to house the connector and shaped to mechanically engage with the communications port;
a visual indicator communicatively coupled to the plurality of electrical conduits and configured to visually indicate information associated with the communications port when the connector is communicatively coupled to the communications port; and
a read-only memory configured to:
indicate that the module is port beacon module and not an normal optical transceiver; and
store information on how to program the visual indicator.

8. A method for fabricating a module comprising:
housing, within a housing, a connector configured to electrically couple with a communications port of an information handling system, wherein the connector comprises a plurality of electrical conduits and wherein the housing is shaped to mechanically engage with the communications port and wherein the communications port is an optical port configured to receive an optical transceiver; and
communicatively coupling a visual indicator to the plurality of electrical conduits, wherein the visual indicator is configured to visually indicate information associated with the communications port when the connector is communicatively coupled to the communications port.

9. The method of claim 8, wherein the module shares at least two physical dimensions of the optical transceiver.

10. The method of claim 8, wherein behavior of the visual indicator is programmable.

11. The method of claim 10, further comprising communicatively coupling a programmable logic device to the plurality of electrical conduits and the visual indicator and housing the programmable logic device in the housing, wherein the programmable logic device is configured to be programmed to control behavior of the visual indicator.

12. A method for fabricating a module comprising:
housing, within a housing, a connector configured to electrically couple with a communications port of an information handling system, wherein the connector comprises a plurality of electrical conduits and wherein the housing is shaped to mechanically engage with the communications port;
communicatively coupling a visual indicator to the plurality of electrical conduits, wherein the visual indicator is configured to visually indicate information associated with the communications port when the connector is communicatively coupled to the communications port; and
mechanically coupling an optically-transmissive enclosure to the housing and enclosing the visual indicator within the optically-transmissive enclosure.

13. The method of claim 8, wherein the visual indicator comprises a light-emitting diode.

14. An information handling system, comprising:
a processor; and
a module communicatively coupled to the processor and comprising:
a connector configured to electrically couple with a communications port of an information handling system, the connector comprising a plurality of electrical conduits and wherein the communications port is an optical port configured to receive an optical transceiver;
a housing configured to house the connector and shaped to mechanically engage with the communications port; and
a visual indicator communicatively coupled to the plurality of electrical conduits and configured to visually indicate status information associated with the communications port when the connector is communicatively coupled to the communications port.

15. The information handling system of claim 14, wherein the module shares at least two physical dimensions of the optical transceiver.

16. The information handling system of claim 14, wherein behavior of the visual indicator is programmable.

17. The information handling system of claim 16, wherein the module further comprises a programmable logic device communicatively coupled to the plurality of electrical conduits and the visual indicator, wherein the programmable logic device is configured to be programmed to control behavior of the visual indicator.

18. An information handling system comprising:
a processor; and
a module communicatively coupled to the processor and comprising:
a connector configured to electrically couple with a communications port of an information handling system, the connector comprising a plurality of electrical conduits;
a housing configured to house the connector and shaped to mechanically engage with the communications port;
a visual indicator communicatively coupled to the plurality of electrical conduits and configured to visually indicate status information associated with the communications port when the connector is communicatively coupled to the communications port; and
an optically-transmissive enclosure mechanically coupled to the housing and configured to enclose the visual indicator.

19. The information handling system of claim 14, wherein the visual indicator comprises a light-emitting diode.

* * * * *